United States Patent
Matsuo et al.

(10) Patent No.: US 6,270,567 B1
(45) Date of Patent: *Aug. 7, 2001

(54) SURFACE APPEARANCE-IMPROVING AGENT

(75) Inventors: Shigemi Matsuo; Yasumasa Udagawa; Minoru Yaguchi, all of Kanagawa (JP)

(73) Assignee: MBT Holding AG, Zurich (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,915

(22) Filed: Dec. 14, 1998

(30) Foreign Application Priority Data

Dec. 26, 1997 (JP) .................................................. 9-370242

(51) Int. Cl.$^7$ ....................................................... C04B 7/00
(52) U.S. Cl. ..................... 106/802; 106/719; 106/724; 106/727; 106/764; 524/4
(58) Field of Search .................................... 106/719, 724, 106/727, 764, 802; 523/401; 524/4

(56) References Cited

U.S. PATENT DOCUMENTS

| 4,209,336 | 6/1980 | Previte ................................. 106/90 |
| 5,258,072 | 11/1993 | Gopalkirshnan et al. ............ 106/802 |

FOREIGN PATENT DOCUMENTS

10251050 * 9/1998 (JP) .

OTHER PUBLICATIONS

Copy of GB Patent Office Search Report for GB 9828269.2 dated Mar. 25, 1999.

* cited by examiner

*Primary Examiner*—Robert Dawson
*Assistant Examiner*—D. Aylward
(74) *Attorney, Agent, or Firm*—Fish & Richardson P.C.

(57) ABSTRACT

A material for improving the surface appearance of cementitious mouldings comprises a polyalkylene oxide compound which is selected from polypropylene oxide adducts of either polyethylene glycol or polyethylene oxide-ethylene diamine adduct, polypropylene oxide chains being attached to all terminal groups. The material may be added to a cementitious composition as an admixture or applied to the surface of a moulding which has not yet hardened.

9 Claims, No Drawings

SURFACE APPEARANCE-IMPROVING AGENT

This invention relates to surface appearance-improving agents for mouldings of cementitious materials.

"Mouldings" in this case include concrete which has been cast in place or cementitious compositions which have been placed in a form or a mould. Such compositions include cement paste, mortar, grout and concrete.

For all such mouldings, good surface appearance is a requirement. It is especially important for concrete which is cast in place and which is to remain exposed without further surface treatment. When casting is taking place, the concrete is generally consolidated by means of a vibrator. The result of this consolidation is often marks on the surface.

Attempts have been made to solve this problem by means of admixtures, for example, silicone- or fatty acid ester-based antifoaming agents, or polyethylene oxide adducts of polypropylene glycol. Although these materials decrease the number of consolidation marks, they often result in the appearance of fewer, larger marks. In addition, they can remove completely minute foam marks which do not mar appearance but which contribute to freeze-thaw resistance and therefore have a deleterious effect on the durability of the concrete.

For mouldings cast in a factory, it is possible to use a very fluid concrete. However, foam marks are relatively easily made in such a concrete, and their removal necessitates more work.

It has now been found that these problems can be substantially and sometimes completely overcome by the use of a particular admixture. The invention therefore provides a method of improving the surface appearance of a moulding of a hardened cementitious material by treating the cementitious material prior to hardening with an admixture which comprises a polyalkylene oxide compound selected from the group consisting of (a) a polypropylene oxide adduct of a polyethylene glycol; and (b) a polypropylene oxide adduct of an ethylene diamine polyethylene oxide adduct said compound being polyethylene glycol or ethylene diamine polyethylene oxide adduct with polypropylene oxide chains attached to all terminal groups thereof.

By "treating" is meant either mixing the admixture into the cementitious material at mixing stage, or applying it to the surface of an already moulded, but not yet hardened, cementitious composition. The mixing is preferred.

It is possible and permissible to use both types of polyalkylene oxide compound in a single cementitious material. It is also possible to use more than one type of each.

The polyalkylene oxide compounds hereinabove described are either polyethylene glycol or polyethylene glycol-ethylene diamine adducts on all terminal groups of which have been grafted chains of propylene oxide units. Thus, the polyalkylene oxide compounds of type (a) will have two polypropylene oxide chains per molecule and those of type (b) will have four per molecule. These polyalkylene oxide compounds have an average molecular weight (weight-average) of from 2,000–10,000, preferably 2,500–7,500 as measured by gel permeation chromatography with sodium polystyrene sulphonate as standard.

It is preferred that there should be from 3–50 moles ethylene oxide per mole of polyalkylene oxide compound, and that the weight ratio of ethylene oxide to propylene oxide should be from 5:95–40:60. The ratio may be selected, depending on the solubility in water desired and the amount of air entrainment of a given cementitious composition.

When the polyalkylene oxide compound is mixed into the cement composition, it should be present to the extent of from 0.001–5% by weight solids on cement. Preferably, it is present to the extent of from 0.01–0.5% by weight.

There may also be added to the admixture a water-reducing agent, for example, lignosulfonic acid salts, oxycarboxylic acid salts, polyalkylsulfonic acid salts, polycarboxylic acid salts, condensate salts of napthalenesulfonic acid and formalin, condensate salts of melaminesulfonic acid and formalin, aminosulfonic acid salts and polysaccharide derivatives.

The oxycarboxylic acid salts hereinabove described may include glucoronic acid, citric acid and glucaric acid salts. The polycarboxylic acid salts may include a copolymer of arylether and maleic acid half ester, and the salts thereof, a copolymer of styrene and maleic acid half ester, and the salts thereof, a copolymer of (meth)acrylic acid salt and (meth) acrylate, and the salts thereof. The polysaccharide derivatives may include saccharide alcohol, sulfurated polysaccharide and the like.

The amount of the water-reducing agent used is preferably 0.01–5 wt. % solids by weight on cement.

The admixture for use in the process of the present invention may contain other art-recognised materials in art-recognised quantities to perform their normal functions. Such materials include, but are not restricted to, aeration control agents, shrinkage reducing agents, accelerators, retarders, foaming agents, anti-foaming agents and thickeners.

The invention additionally provides a surface appearance improvement admixture for cementitious compositions, comprising a polyalkylene oxide compound selected from the group consisting of (a) a polypropylene oxide adduct of a polyethylene glycol; and (b) a polypropylene oxide adduct of an ethylene diamine polyethylene oxide adduct The invention is further described by reference to the following non-limiting examples.

1. Materials

Water

Cement: ordinary portland cement (specific gravity 3.16) manufactured by Chichibuonoda Co., Ltd.

Fine aggregate: Oi River pit sand (specific gravity 2.59, FM=2.74)

Coarse aggregate: Oume crushed stone (specific gravity 2.65, MS=20mm)

Types of polyalkylene derivatives (examples according to the invention)

P-1: The average molecular weight is 2,750 and the polyalkylene glycol derivative in which propylene oxide at the ratio of 10/90 (wt. %) between ethylene oxide and propylene oxide is added to the both terminals of polyethylene glycol of 6 moles of ethylene group. (trade name, "Adeka" 25R-1, manufactured by Asahidenka Kogyo Co., Ltd.)

P-2: The average molecular weight is 3,000 and the polyalkylene glycol derivative in which propylene oxide at the ratio of 20/80 (wt.%) between ethylene oxide and propylene oxide is added to the both terminals of polyethylene glycol of 13 moles of ethylene oxide group. (trade name, "Adeka" 25R-2, manufactured by Asahidenka Kogyo Co., Ltd.)

P-3: The average molecular weight is 6,000 and the polyalkylene glycol derivative in which propylene oxide at the ratio of 30/70 (wt. %) between ethylene oxide and propylene oxide is added to the both terminals of polyethylene oxide adduct of ethylenediamine and 5 moles of ethylene oxide group. (trade name, "Adeka" TR-913R, manufactured by Asahidenka Kogyo Co. Ltd.)

Types of anti-foaming agents

DEF-1: Polyalkylene glycol type anti-foaming agent in which propylene oxide is added to the both terminals of polyethylene glycol. "Pluronic" L-61 (trade name) manufactured by BASF Co., Ltd.

DEF-2: Silicon type anti-foaming agent, "Antifoam"-80 (trade name), manufactured by Dow Corning, Ltd.

DEF-3: Fatty acid ester type anti-foaming agent, "Trimin" DF#2J (trade name) manufactured by Miyoshi Yushi Co., Ltd.

Types of water-reducing agents

PCA: Polycarboxylic acid type high-range AE water-reducing agent, "Rheobuild" SP8N (trade name) manufactured by NMB Co., Ltd.

NSF: Naphthalene type high-range water-reducing agent, "Rheobuild" SP9N (trade name) manufactured by NMB Co., Ltd.

MSF: Melamine type high-range water-reducing agent, "Rheobuild" NL4000 (trade name) manufactured by NMB Co., Ltd.

LSN: Lignin type AE water-reducing agent, "Pozzolith" No. 70 (trade name) manufactured by NMB Co., Ltd.

2. Preparation of concrete

Two types of concrete are prepared. One is a dry-mix concrete with a slump of 8±1cm and an air content of 2±0.5 volume % as shown in Table 1, and the other is a high-flow concrete of slump 60±5 cm and air content of 2±0.5 volume % as shown in Table 2.

The desired slump, flow and air content are obtained by the addition of water-reducing agent and air content-regulating agent, until they fall within the desired ranges.

TABLE 1

Blend of dry-mix concrete

| Water/cement ratio (%) | Fine aggregate ratio (%) | Unit amount (kg/m3) | | | |
|---|---|---|---|---|---|
| | | Water | Cement | Fine aggregate | Coarse aggregate |
| 50.0 | 45 | 160 | 320 | 838 | 1048 |

TABLE 2

Blend of high-flow concrete

| Water/cement ratio (%) | Fine aggregate ratio (%) | Unit amount (kg/m3) | | | |
|---|---|---|---|---|---|
| | | Water | Cement | Fine aggregate | Coarse aggregate |
| 35.0 | 50 | 170 | 486 | 850 | 869 |

3. Measurement of Propertise

The quantities of materials are adjusted so that a mix amount of 80 liters is given, and concrete is then prepared by placing all materials into a 100 liter pan-type forced mixing mixer, followed by mixing for 120 seconds.

The slump or the flow, the air content and the surface appearance of the concrete mouldings are evaluated by the following methods.

(a) Slump and flow: JIS A1101

(b) Air content: JIS A1128

(c) Surface appearance of concrete moulding:

The concrete is placed perpendicularly into a plate steel form of 15×45×53 cm, and after hardening, the area ratio of undesirable marking is calculated by measuring the total number of foam marks and the proportion of the area of the surface of the concrete moulding which they cover.

A (good): The state where there is no foam mark exceeding ø3 mm per 20×20 cm$^2$ and the area ratio of foam marks is not more than 0.5%.

B (average): The state where there are foam marks exceeding ø3 mm per 20×20 cm$^2$, but the area ratio of foam marks is 0.5–2.0%.

C (bad): The state where there are not less than five foam marks exceeding ø3 mm per 20×20 cm and the area ratio of foam marks exceeds 2.0%.

4. Test results

Table 3 shows the test results in the case of moulding dry-mix concrete and Table 4 the test results in the case of moulding high-flow concrete.

TABLE 3

| | | Polyalkylene glycol derivative or anti-forming agent | | Water-reducing agent | | Surface appearance of concrete moulding | | |
|---|---|---|---|---|---|---|---|---|
| | | Type | added amount (CX %)* | Type | added amount (CX %)* | Number of foam marks exceeding ø3 mm | Area ratio (%) | General evaluation |
| Example | 1 | P-1 | 0.05 | PCA | 0.7 | none | 0.2 | A |
| | 2 | P-1 | 0.05 | NSF | 1.6 | none | 0.4 | A |
| | 3 | P-1 | 0.05 | MSF | 1.8 | none | 0.2 | A |
| | 4 | P-1 | 0.05 | LSN | 0.4 | none | 0.4 | A |
| | 5 | P-2 | 0.05 | PCA | 0.7 | none | 0.2 | A |
| | 6 | P-3 | 0.05 | PCA | 0.7 | none | 0.2 | A |
| Comparative Example | 1 | DEF-1 | 0.05 | PCA | 0.7 | 4 | 1.3 | B |
| | 2 | DEF-1 | 0.05 | NSF | 1.6 | 8 | 3.4 | C |
| | 3 | DEF-1 | 0.05 | MSF | 1.8 | 3 | 1.1 | B |
| | 4 | DEF-1 | 0.05 | LSN | 0.4 | 17 | 0.9 | C |
| | 5 | — | — | PCA | 0.7 | 21 | 6.4 | C |
| | 6 | — | — | NSF | 1.6 | 32 | 7.7 | C |

TABLE 3-continued

| | | Polyalkylene glycol derivative or anti-forming agent | | Water-reducing agent | | Surface appearance of concrete moulding | | |
|---|---|---|---|---|---|---|---|---|
| | | Type | added amount (CX %)* | Type | added amount (CX %)* | Number of foam marks exceeding ø3 mm | Area ratio (%) | General evaluation |
| | 7 | — | — | MSF | 1.8 | 13 | 3.6 | C |
| | 8 | — | — | LSN | 0.4 | 39 | 7.5 | C |

*solids by weight on cement

TABLE 4

| | | Polyalkylene glycol derivative or anti-forming agent | | Water-reducing agent | | Surface appearance of concrete moulding | | |
|---|---|---|---|---|---|---|---|---|
| | | Type | added amount (CX %) | Type | added amount (CX %) | Number of foam marks exceeding ø3 mm | Area ratio (%) | General evaluation |
| Example | 7 | P-1 | 0.05 | PCA | 1.2 | none | 0.2 | A |
| | 8 | P-2 | 0.05 | PCA | 1.2 | none | 0.3 | A |
| | 9 | P-3 | 0.05 | PCA | 1.2 | none | 0.3 | A |
| Comparative | 9 | DEF-1 | 0.05 | PCA | 1.2 | 6 | 1.2 | B |
| Example | 10 | DEF-2 | 0.05 | PCA | 1.2 | 15 | 2.8 | C |
| | 11 | DEF-3 | 0.05 | PCA | 1.2 | 5 | 1.1 | B |

As shown in Tables 3 and 4, there were no foam marks exceeding ø3 mm in the examples 1–9 wherein the surface appearance-improving agents for the cement mouldings in the present invention were used, and furthermore, the area ratio of the foam marks was less than 1%, and the surface appearance was evaluated as "good".

On the other hand, in the comparative examples 1–4 and 9–11 wherein anti-foam agents and water-reducing agents were added, and in the comparative examples 5–8 and 12 wherein the water-reducing agents were added, there occurred foam marks exceeding ø3 mm. Furthermore, the area ratio of the foam marks was more than 0.5%, and the surface-appearance was evaluated as "average" or "bad".

From the above results, the surface of mouldings of the dry-mix concrete and the high-flow concrete which used the surface appearance-improving agents according to the invention exhibit considerably improved surface appearance.

By using the surface appearance-improving agents for cement mouldings according to the present invention, the occurrence of foam marks on the concrete surface is prevented without deterioration of the durability of the concrete.

What is claimed is:

1. A method of improving the surface appearance of a moulding of a hardened cementitious material by treating the cementitious material prior to hardening with an admixture which comprises a polyalkylene oxide compound selected from the group consisting of:
   (a) a polypropylene oxide adduct of a polyethylene glycol; and
   (b) a polypropylene oxide adduct of an ethylene diamine polyethylene adduct said compound being polyethylene glycol or ethylene diamine polyethylene oxide adduct with polypropylene oxide chains attached to all terminal groups thereof wherein the admixture is applied to the surface of an already moulded, but not yet hardened, cementitious composition.

2. A method according to claim 1, wherein the polyalkylene oxide compound has an average molecular weight (weight-average) of from 2,000–10,000, preferably 2,500–7,500 measured by gel permeation chromatography with sodium polystyrene sulphonate as standard.

3. A method according to claim 1, wherein there are from 3–50 moles ethylene oxide per mole of polyalkylene oxide compound, and the weight ratio of ethylene oxide to propylene oxide is from 5:95–40:60.

4. A method according to claim 1, wherein the polyalkylene oxide compound is present in the mix to the extent of from 0.001–5%, by weight solids on cement.

5. A method according to claim 1, wherein the admixture additionally comprises a water-reducing agent.

6. A surface appearance improvement admixture for cementitious compositions, comprising a polyalkylene oxide compound selected from the group consisting of:
   (a) a polypropylene oxide adduct of a polyethylene glycol: and
   (b) a polypropylene oxide adduct of an ethylene diamine polyethylene oxide adduct said compound being polyethylene glycol or ethylene diamine polyethylene oxide adduct with polypropylene oxide chains attached to all terminal groups thereof, and which further comprises; a water-reducing agent.

7. A surface appearance improvement admixture according to claim 6, wherein the admixture additionally comprises a water-reducing agent selected from the group consisting of lignosulfonic acid salts, oxycarboxylic acid salts, polyalkylsulfonic acid salts, polycarboxylic acid salts, condensate salts of napthalenesulfonic acid and formalin, condensate salts of melaminesulfonic acid and formalin, aminosulfonic acid salts and polysaccharide derivatives.

8. A method according to claim 4, wherein the polyalkylene oxide compound is present in the mix to the extent of 0.01–0.5%, by weight solids on cement.

9. A method according to claim 5, wherein the water-reducing agent is selected from the group consisting of lignosulfonic acid salts, oxycarboxylic acid salts, polyalkylsulfonic acid salts, polycarboxylic acid salts, condensate salts of napthalenesulfonic acid and formalin, condensate salts of melaminesulfonic acid and formalin, aminosulfonic acid salts and polysaccharide derivatives.

* * * * *